(12) United States Patent
Sterling et al.

(10) Patent No.: US 11,913,562 B2
(45) Date of Patent: Feb. 27, 2024

(54) VALVE, AND APPLICATIONS THEREOF IN ROBOT SYSTEMS

(71) Applicant: Sanctuary Cognitive Systems Corporation, Vancouver (CA)

(72) Inventors: George E. G. Sterling, Vancouver (CA); Connor Richard Shannon, Vancouver (CA); Douglas Bruce Jelstad, Vancouver (CA); Leo James Stocco, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 17/976,665

(22) Filed: Oct. 28, 2022

(65) Prior Publication Data

US 2023/0139470 A1 May 4, 2023

Related U.S. Application Data

(60) Provisional application No. 63/273,104, filed on Oct. 28, 2021.

(51) Int. Cl.
| | | |
|---|---|---|
| *F16K 3/30* | (2006.01) | |
| *F16K 3/24* | (2006.01) | |
| *B25J 9/14* | (2006.01) | |
| *F16K 27/04* | (2006.01) | |

(52) U.S. Cl.
CPC ............ *F16K 3/24* (2013.01); *B25J 9/14* (2013.01); *F16K 3/30* (2013.01); *F16K 27/041* (2013.01)

(58) Field of Classification Search
CPC .. F16K 3/24; F16K 3/30; F16K 27/041; B25J 9/14
See application file for complete search history.

(56) References Cited

U.S. PATENT DOCUMENTS

| | | | | |
|---|---|---|---|---|
| 4,022,425 A | * | 5/1977 | Govzman | ........... F16K 11/0708 251/324 |
| 4,418,711 A | * | 12/1983 | Stoll | ..................... F16K 27/041 137/625.69 |
| 5,623,967 A | * | 4/1997 | Hayashi | ................ F16K 27/041 251/63.4 |
| 2023/0014627 A1 | * | 1/2023 | Suzuki | ................ F16K 11/0716 |

* cited by examiner

*Primary Examiner* — Kevin R Barss
(74) *Attorney, Agent, or Firm* — Thomas Mahon; Adenike Adebiyi

(57) ABSTRACT

In an implementation, a hydraulic valve includes a valve body, a cylindrical chamber within the valve body, and a cylindrical spool within the chamber. The spool is rotatable between at least a first position and a second position about a longitudinal axis parallel to a longitudinal axis of the chamber. The spool includes a landing and an eccentric channel that extends around a portion of an outer circumferential surface of the landing. In the first position, an inlet and an outlet of the hydraulic valve are fluidly coupled by the eccentric channel to allow a flow of a hydraulic fluid circumferentially around the landing from the inlet to the outlet. In the second position, the inlet and/or the outlet are obstructed by another portion of the outer circumferential surface of the landing to prevent the flow of the hydraulic fluid from the inlet to the outlet.

20 Claims, 14 Drawing Sheets

VALVE, AND APPLICATIONS THEREOF IN ROBOT SYSTEMS

TECHNICAL FIELD

The present systems, devices, and methods generally relate to fluid-based valves, and particularly relate to hydraulic valves for hydraulically-actuated robotic components.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

Hydraulic systems can include one or more hydraulic valves. A hydraulic valve can control a flow of hydraulic fluid in a hydraulic system. Some hydraulic valves control the flow of hydraulic fluid by opening or closing the valve. Some hydraulic valves control the flow of hydraulic fluid by continuously regulating the flow. Hydraulic valves can be actuated, for example, by a handle, knob or cam, or can be solenoid-operated or pilot-operated.

A directional control valve can pause and restart a flow of hydraulic fluid, and/or change a direction of flow. An example of a directional control valve is a two-way directional control valve comprising two ports referred to as an inlet and an outlet.

A pressure control valve can regulate a pressure of a hydraulic fluid in a hydraulic system, for example by releasing an excess pressure.

A flow control valve can be used to improve hydraulic system performance by adjusting a flow of a hydraulic fluid through the hydraulic system.

BRIEF SUMMARY

A valve may be summarized as comprising a valve body, a first cylindrical chamber within the valve body, and a first cylindrical spool within the first cylindrical chamber, the first cylindrical spool rotatable about a longitudinal axis between at least a first position and a second position, and the longitudinal axis parallel to a longitudinal axis of the first cylindrical chamber. The first cylindrical spool may comprise a first landing having a first thickness parallel to the longitudinal axis of the first cylindrical chamber, and a first eccentric channel having a first length that extends around a first portion of an outer circumferential surface of the first landing and a first width less than the first thickness of the first landing. The valve may further comprise a first inlet to the valve, and a first outlet from the valve, wherein, in the first position, the first inlet and the first outlet are fluidly coupled by the first eccentric channel to allow a flow of a fluid circumferentially around the first landing from the first inlet to the first outlet within the valve, and, in the second position, at least one of the first inlet and the first outlet is obstructed by a second portion of the outer circumferential surface of the first landing to prevent the flow of the fluid from the first inlet to the first outlet within the valve.

In some implementations, the first cylindrical spool further comprises a first concentric groove adjacent to the first landing, the first concentric groove housing a first gasket, the first gasket which in operation provides a seal at a first end of the first landing. The first gasket may include, or consist of, a first O-ring. The first cylindrical spool may further comprise a second concentric groove adjacent to the first landing, the first landing interposed between the first concentric groove and the second concentric groove, the second concentric groove housing a second gasket, the second gasket which in operation provides a seal at a second end of the first landing. The second gasket may include, or consist of, a second O-ring.

In some implementations, the first cylindrical spool is a loose fit within the first cylindrical chamber.

In some implementations, the valve body includes, or is manufactured from, aluminum.

In some implementations, the first cylindrical spool includes, or is manufactured from, brass.

In some implementations, the valve body is a hexagonal prism.

In some implementations, at least a portion of the valve body is formed by one of an assembly from multiple elements, a casting, a mold, a 3D-printing, or a machining from a solid cylinder.

In some implementations, the fluid is an oil.

In some implementations, each of the inlet and the outlet comprise a respective through hole and a respective fitting, the fitting fluidly coupleable to a hose.

In some implementations, the first cylindrical spool is also rotatable about the longitudinal axis between at least a third position and a fourth position, the valve further comprising a second landing having a second thickness parallel to the longitudinal axis of the first cylindrical chamber, the second landing separated from the first landing by a first concentric groove, the first concentric groove housing a first gasket, the first gasket which in operation provides a seal between the first landing and the second landing, and a second eccentric channel having a second length that extends around a first portion of an outer circumferential surface of the second landing and a second width less than the second thickness of the second landing. The valve may further comprise a second inlet to the valve, and a second outlet from the valve, wherein, in the third position, the second inlet and the second outlet are fluidly coupled by the second eccentric channel to allow a flow of a fluid circumferentially around the second landing from the second inlet to the second outlet within the valve, and in the fourth position, at least one of the second inlet and the second outlet is obstructed by a second portion of the outer circumferential surface of the second landing to prevent the flow of the fluid from the second inlet to the second outlet within the valve.

In some implementations, the first cylindrical spool further comprises a second concentric groove adjacent to the first landing, the first landing interposed between the first concentric groove and the second concentric groove, the second concentric groove housing a second gasket, the second gasket which in operation provides a seal at an end of the first landing adjacent to the second concentric groove, and a third concentric groove adjacent to the second landing, the second landing interposed between the first concentric groove and the third concentric groove, the third concentric groove housing a third gasket, the third gasket which in operation provides a seal at an end of the second landing adjacent to the third concentric groove.

In some implementations, at least one of the first gasket, the second gasket, or the third gasket includes, or consists of, an O-ring.

In some implementations, the valve further comprises a second cylindrical chamber within the valve body, a second cylindrical spool within the second cylindrical chamber, the second cylindrical spool rotatable about a longitudinal axis between at least a third position and a fourth position, the longitudinal axis parallel to a longitudinal axis of the second cylindrical chamber. The second cylindrical spool may comprise a second landing having a second thickness parallel to the longitudinal axis of the second cylindrical chamber, and a second eccentric channel having a second length that extends around a first portion of an outer circumferential surface of the second landing and a second width less than the second thickness of the second landing. The valve may comprise a second inlet to the valve, and a second outlet from the valve, wherein, in the third position, the second inlet and the second outlet are fluidly coupled by the second eccentric channel to allow a flow of a fluid circumferentially around the second landing from the second inlet to the second outlet within the valve, and, in the fourth position, at least one of the second inlet and the second outlet is obstructed by a second portion of the outer circumferential surface of the second landing to prevent the flow of the fluid from the second inlet to the second outlet within the valve.

A system may be summarized as comprising a valve, the valve comprising a valve body, a first cylindrical chamber within the valve body, a first cylindrical spool within the first cylindrical chamber, the first cylindrical spool rotatable about a longitudinal axis between at least a first position and a second position, the longitudinal axis parallel to a longitudinal axis of the first cylindrical chamber, the first cylindrical spool comprising, a first landing having a first thickness parallel to the longitudinal axis of the first cylindrical chamber, and a first eccentric channel having a first length that extends around a first portion of an outer circumferential surface of the first landing and a first width less than the first thickness of the first landing. The valve may comprise a first inlet to the valve, and a first outlet from the valve, wherein, in the first position, the first inlet and the first outlet are fluidly coupled by the first eccentric channel to allow a flow of a fluid circumferentially around the first landing from the first inlet to the first outlet within the valve, and, in the second position, at least one of the first inlet and the first outlet is obstructed by a second portion of the outer circumferential surface of the first landing to prevent the flow of the fluid from the first inlet to the first outlet within the valve. The system may comprise a motor assembly, the motor assembly operable to rotate the first cylindrical spool within the first cylindrical chamber between at least the first position and the second position.

In some implementations, the motor assembly comprises a motor, and a driveshaft, wherein the driveshaft is mechanically coupled to the motor and to the first cylindrical spool.

In some implementations, the system further comprises an accumulator, a pump, a reservoir, and an actuatable component, wherein the valve is operable to control at least one of a pressure or an exhaust of the actuatable component. The actuatable component may be an actuation piston.

A robot may be summarized as comprising a robot body, a hydraulic control system physically coupled to the robot body, a hydraulically-actuated component physically coupled to the robot body, the hydraulically-actuated component operable to cause a motion of at least a portion of the robot, and a hydraulic assembly comprising a hydraulic valve. The hydraulic valve may comprise a valve body, a first cylindrical chamber within the valve body, and a first cylindrical spool within the first cylindrical chamber, the first cylindrical spool rotatable about a longitudinal axis between at least a first position and a second position, the longitudinal axis parallel to a longitudinal axis of the first cylindrical chamber. The first cylindrical spool may comprise a first landing having a first thickness parallel to the longitudinal axis of the first cylindrical chamber, and a first eccentric channel having a first length that extends around a first portion of an outer circumferential surface of the first landing and a first width less than the first thickness of the first landing. The hydraulic valve may comprise a first inlet to the hydraulic valve, and a first outlet from the hydraulic valve, wherein, in the first position, the first inlet and the first outlet are fluidly coupled by the first eccentric channel to allow a flow of a hydraulic fluid circumferentially around the first landing from the first inlet to the first outlet within the hydraulic valve, and, in the second position, at least one of the first inlet and the first outlet is obstructed by a second portion of the outer circumferential surface of the first landing to prevent the flow of the hydraulic fluid from the first inlet to the first outlet within the hydraulic valve. The hydraulic assembly may further comprise a motor assembly operable to rotate the first cylindrical spool within the first cylindrical chamber between at least the first position and the second position.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
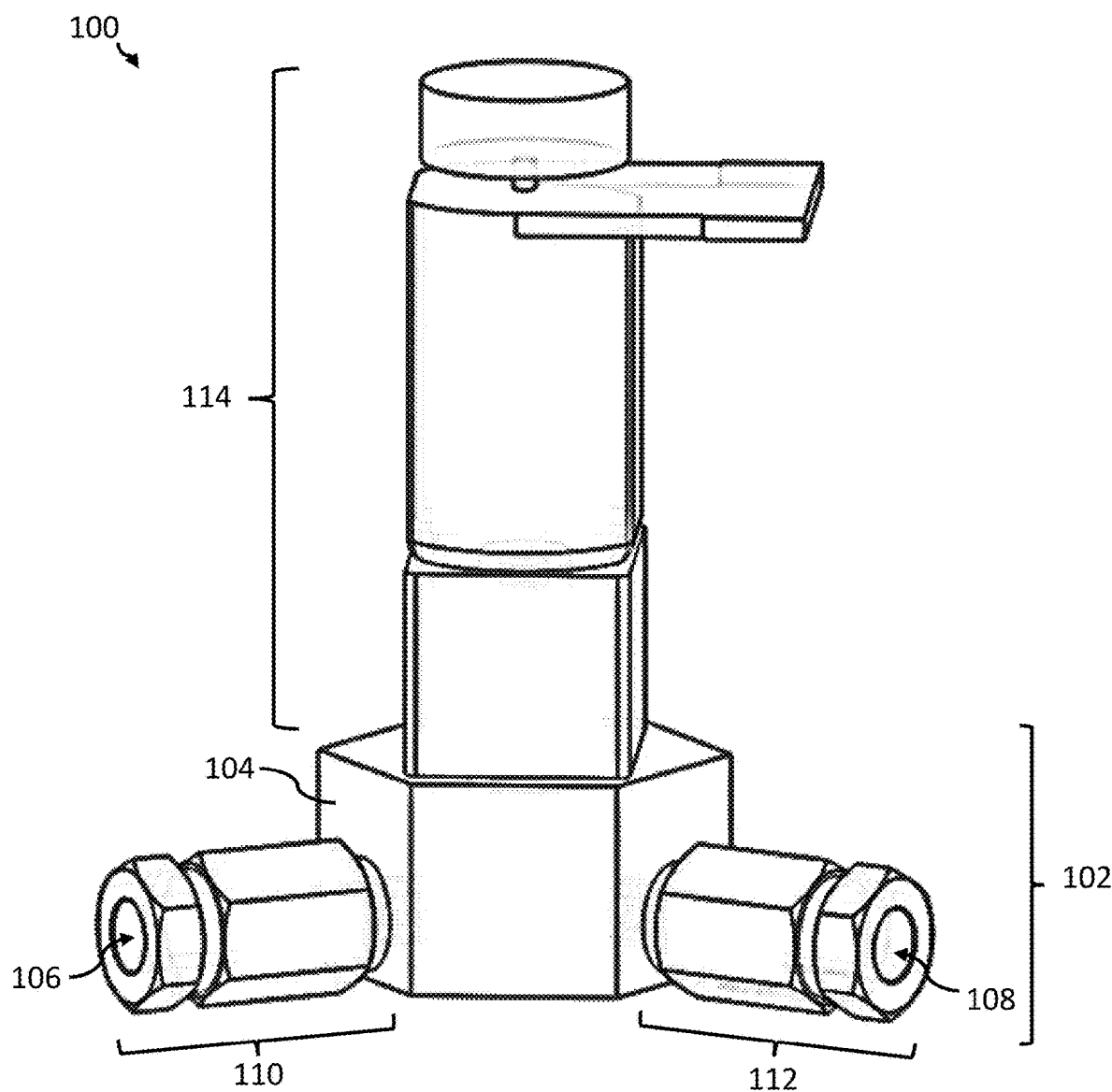
FIG. 1 is a perspective view of an example implementation of a hydraulic assembly, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The technology described in the present application includes systems, devices, and methods for hydraulically-powered robots. In particular, the present application describes valves suitable for use in a hydraulic system, for example a hydraulic system used in a hydraulically-powered robot.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described in the present application includes valves for hydraulic applications including but not limited to hydraulic systems providing power in a robotic system. For example, valves can be used in a hydraulic system providing power to an end effector of a robotic system (e.g., to a hand of a humanoid robot), wherein some or all of the hydraulic system is adapted and/or miniaturized to fit at least partially inside the robot (e.g., inside a robotic arm).

In some implementations, at least a portion of the hydraulic system (e.g., at least one hydraulic hose) is routed through a pivot joint (e.g., a shoulder, an elbow, a forearm, a wrist and/or a knuckle of the robotic arm). A pivot joint can be an example of a restricted space. A restricted space may be restricted in volume, for example. A restricted space may include moving components that can interfere with hydraulic hoses in the space and/or traversing the space, as well as other hydraulic fittings and components in the space. A restricted space may have a volume and/or a shape that can change during operation, e.g. the robot is in motion or is executing a task. In restricted spaces in general, and pivot joints as an example, it can be advantageous for hydraulic fittings to be more compact. It may also be advantageous for hydraulic hoses and fittings (e.g., hydraulic valves) to have smaller dimensions in restricted spaces.

An object or shape is defined as humanoid when it has an appearance, or a character, resembling that of a human. For example, a humanoid robot is a robot having an appearance or a character resembling that of a human. A humanoid robot may be "humanoid" in its entirety or may have humanoid components (e.g., a torso, a head, arms, and hands) coupled to non-humanoid components (e.g., a wheeled base). While the following description focuses mainly on a hydraulically-powered humanoid robot, a person of skill in the art will appreciate that a hydraulic system in accordance with the present technology may be used to control a hand, a foot, a tail, a head, or any applicable end effector or actuator in a humanoid or non-humanoid robot.

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

Hydraulic systems include hydraulic hoses to provide hydraulic coupling, and hydraulic fittings to secure hydraulic hoses to other hydraulic components, e.g., pumps, valves, and actuation pistons.

A conventional spool valve is an example of a hydraulic valve, and includes a cylinder (a spool) in a sealed chamber in a valve body, and at least one through hole drilled through the body from one side to the other to form ports. The spool can be moved within the body to open or close the ports to the flow of hydraulic fluid. The spool can be actuated, for example, by a button, a lever, or a solenoid. In some solenoid-operated spool valves, a spring can be used to return the spool to its resting position. In other solenoid-operated spool valves, there is a solenoid at each end of the valve. Conventional spool valves can be sliding or rotary.

In some applications, it can be desirable for an actuator used to operate a solenoid-operated hydraulic valve to be smaller than a conventional actuator for a spool valve. For example, in the case of a hydraulically-power robot, it can be desirable for a forearm of the hydraulically-powered robot to be able to accommodate as many as forty (40) hydraulic valves.

In some applications, it can be desirable to be able to actuate a hydraulic valve using less torque than a conventional spool valve. The present technology has an at least approximately circular geometry in a hydrostatic (i.e., closed) configuration, and is covered by lubricious hydraulic fluid. There is little or no net force (i.e., equal pressure), and so the valve needs less torque to operate. The operating torque can be reduced further by using O-rings manufactured from a harder material and/or using O-rings with different cross-sections.

In some applications, it can be desirable for multiple channels to be actuated simultaneously. The present technology can include multiple grooves, and, in some cases, additional O-rings separating the grooves, and so multiple channels can be actuated simultaneously.

The present technology can use double-acting cylinders.

The present technology can provide continuous control. Motor backlash can be mitigated by operating the motor in a single rotational direction, In some applications, it can be desirable for the cylinder to continue to maintain an effective seal when the cylinder is showing signs of wear. For at least this reason, the present technology typically has a longer lifetime than a conventional spool valve.

In some applications, it can be desirable to use a rotational actuator (motor) for a hydraulic valve rather than a linear actuator which is typically used with conventional sliding spool valves.

An advantage of the present technology is that the body shape can be readily customized. Some implementations include a manifold, and the manifold can include more than one core. Each core in the manifold is a valve that can be readily replaced.

Unlike a conventional spool valve in which a hydraulic fluid flows through a spool, the present technology includes an eccentric cut in the surface of the cylinder over which a hydraulic fluid can flow.

The present technology includes a rotary hydraulic valve that may have a range of applications, and is particularly well-suited for use in miniaturized hydraulic systems, e.g., hydraulic systems providing control of robot actuation(s).

An advantage of the present technology is that the hydraulic valve is advantageously at least partially immune to wear, and utilizes and balances both static and dynamic fluid forces.

In some implementations of the present technology, a cylindrical core (also referred to as a spool in the present application) rotates freely inside a cylindrical bore (also referred to as a chamber in the present application). In some implementations, the chamber includes at least one radial inlet port and at least one radial outlet port. The spool includes an eccentric (i.e., non-concentric) channel around an outer circumference of the spool through which hydraulic fluid can flow to hydraulically communicatively couple the inlet port and the outlet port. The flow can depend on a rotational alignment between the eccentric channel of the spool and the ports.

In some implementations, the hydraulic fluid that flows from an inlet to an outlet of the hydraulic valve is an oil, for example, a peanut oil or a mineral oil.

FIG. 1 is a perspective view of an example implementation of a hydraulic assembly 100, in accordance with the present systems, devices, and methods. Hydraulic assembly 100 includes a hydraulic valve 102. Hydraulic valve 102 includes a valve body 104, and two ports 106 and 108.

A hydraulic hose (not shown in FIG. 1) can be attached at port 106 using a hydraulic fitting 110. Similarly, another hydraulic hose (also not shown in FIG. 1) can be attached at port 108 using a hydraulic fitting 112. Each of ports 106 and 108 can be an inlet or an outlet for a hydraulic fluid. In some implementations, port 106 is an inlet, and port 608 is an outlet.

Hydraulic assembly also includes a motor assembly 114. Motor assembly 114 includes a motor operable to provide a rotational actuation of hydraulic valve 102.

Figure 2:
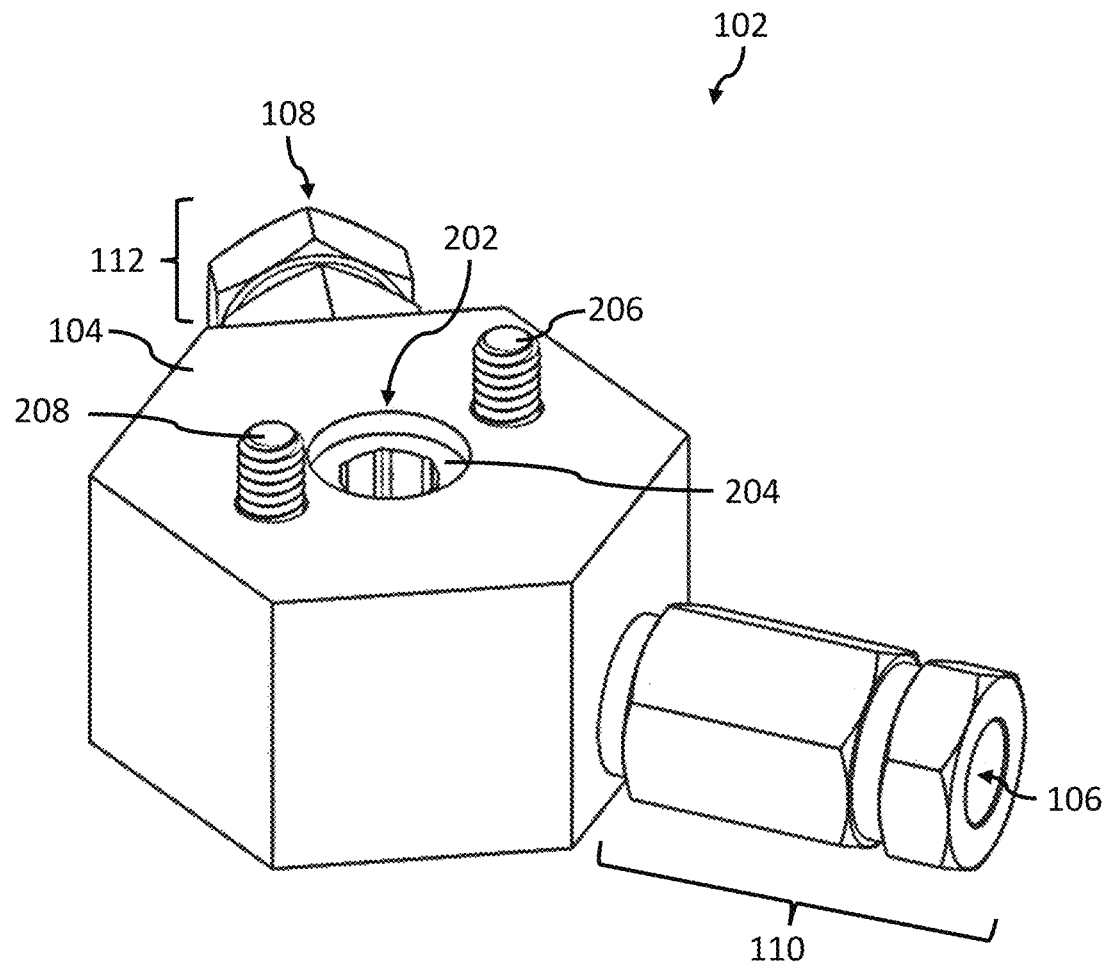
FIG. 2 is a perspective view of the hydraulic valve of FIG. 1, in accordance with the present systems, devices, and methods.

FIG. 2 is a perspective view of hydraulic valve 102 of FIG. 1, in accordance with the present systems, devices, and methods. Hydraulic valve 102 includes valve body 104, and two ports 106 and 108.

Hydraulic valve 102 also includes a chamber 202 for a drive shaft (not shown in FIG. 2) and a spool 204. In some implementations, chamber 202 is drilled in valve body 104. In some implementations, spool 204 fits loosely in chamber 202. The drive shaft can provide a mechanical communicative coupling between spool 204 and a motor (e.g., a motor of motor assembly 110 of FIG. 1). Spool 204 may be caused to rotate within chamber 202 by the motor via the drive shaft.

Hydraulic valve also includes screws 206 and 208 for attachment to motor assembly 110 of FIG. 1.

Figure 3:
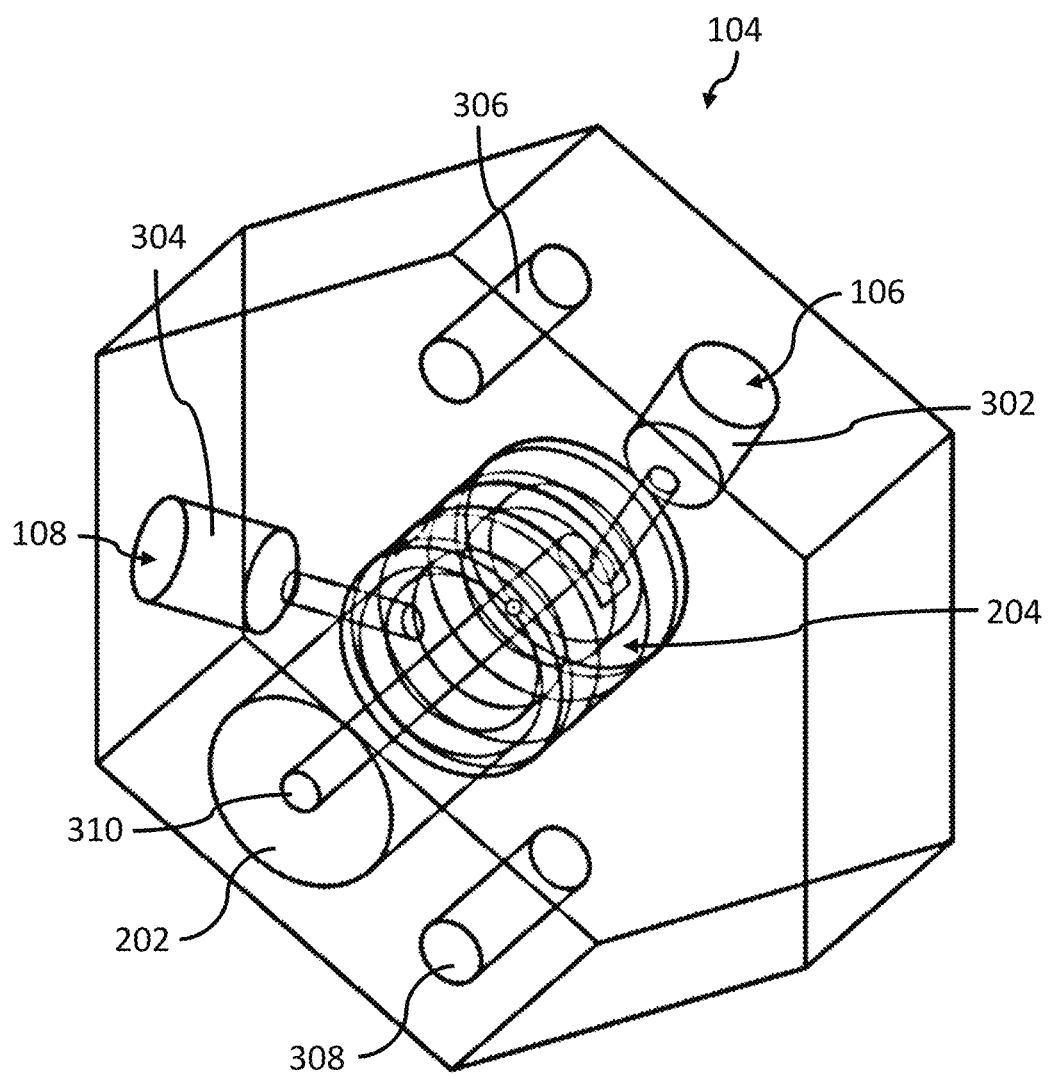
FIG. 3 is a transparent perspective view of the valve body of FIG. 1, in accordance with the present systems, devices, and methods.

FIG. 3 is a transparent perspective view of valve body 104 of FIG. 1, in accordance with the present systems, devices, and methods. Valve body 104 includes through hole 302 for port 106, and through hole 304 for port 108. Each of through holes 302 and 304 may have sections of different diameters, for example, a respective larger diameter section at the outer end of the through hole, and a respective smaller diameter section at the inner end (i.e., closest to chamber 202).

Valve body 104 also includes through holes 306 and 308 for screws 204 and 206, respectively, of FIG. 2. In some implementations, at least some of chamber 202, and through holes 302, 304, 306, and 308 are drilled in valve body 104.

FIG. 3 also shows a spool 204 which can be attached to a motor shaft 310 and driven by a motor of motor assembly 110 of FIG. 1. Spool 208 is described in more detail below.

Figure 4A:
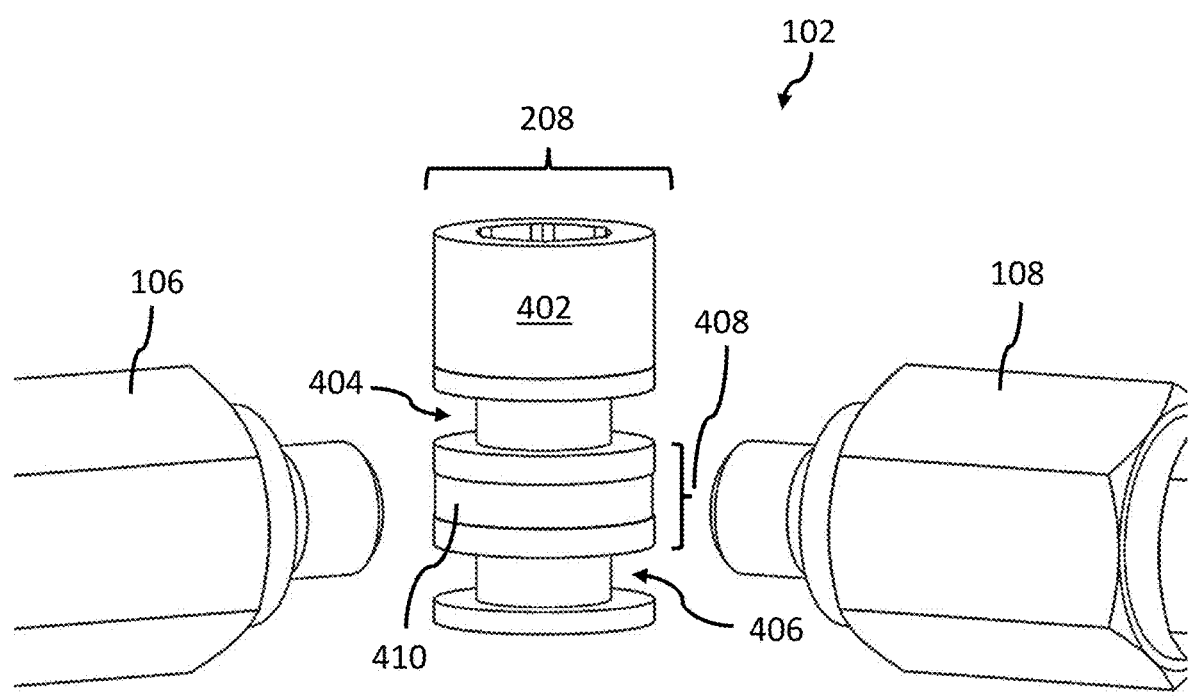
FIG. 4A is an exploded perspective view from the front of an example implementation of the hydraulic valve of FIG. 1, in accordance with the present systems, devices, and methods.

FIG. 4A is an exploded perspective view from the front of an example implementation of hydraulic valve 102 of FIG. 1, in accordance with the present systems, devices, and methods. Hydraulic valve 102 includes spool 204 (shown previously in valve 102 of FIG. 2, and valve body 104 of FIG. 3). Spool 204 includes a cylinder 402 having two concentric grooves 404 and 406, and a landing 408 interposed therebetween. Landing 408 includes an eccentric channel 410.

Spool 208 can, for example, be assembled from multiple elements, cast, molded, 3D-printed, or machined from a solid cylinder. In some implementations, at least some of grooves 404 and 406, and channel 410 on landing 408 are formed in cylinder 402. In some implementations, at least some of grooves 406 and 408, and channel 410 on landing 408 are cut into cylinder 402, for example using a lathe.

Concentric grooves 404 and 406 typically extend around a circumference of cylinder 402 and have approximately uniform depth. Eccentric channel 410 typically has a variable depth, and extends around only a portion of the circumference of cylinder 402.

In operation, as explained in more detail below, eccentric channel 410 can allow hydraulic fluid to pass between ports 106 and 108 of hydraulic valve 102. Concentric grooves 404 and 406 can each provide a respective space for an O-ring or other suitable gasket or seal.

Figure 4B:
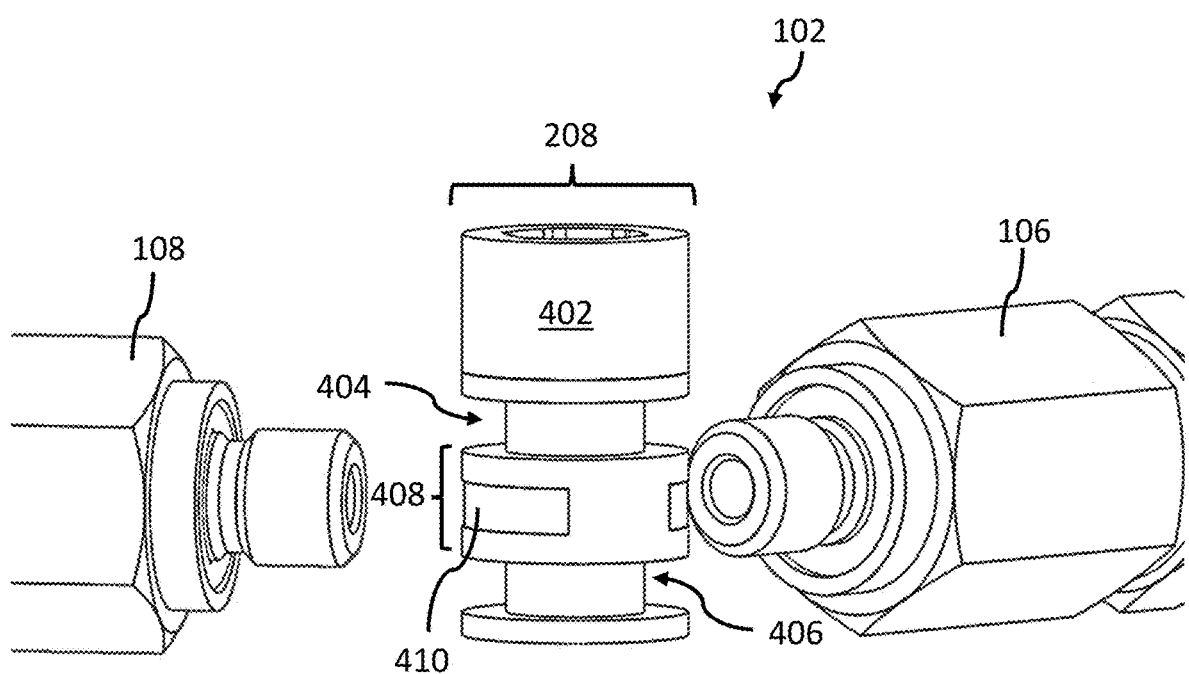
FIG. 4B is an exploded perspective view from the back of the example implementation of FIG. 4A of the hydraulic valve of FIG. 1, in accordance with the present systems, devices, and methods.

FIG. 4B is an exploded perspective view from the back of the example implementation of FIG. 4A of hydraulic valve 102 of FIG. 1, in accordance with the present systems, devices, and methods.

For clarity of illustration of spool 208, valve body 104 of hydraulic valve 102 is not shown in FIGS. 4A and 4B.

Figure 5A:
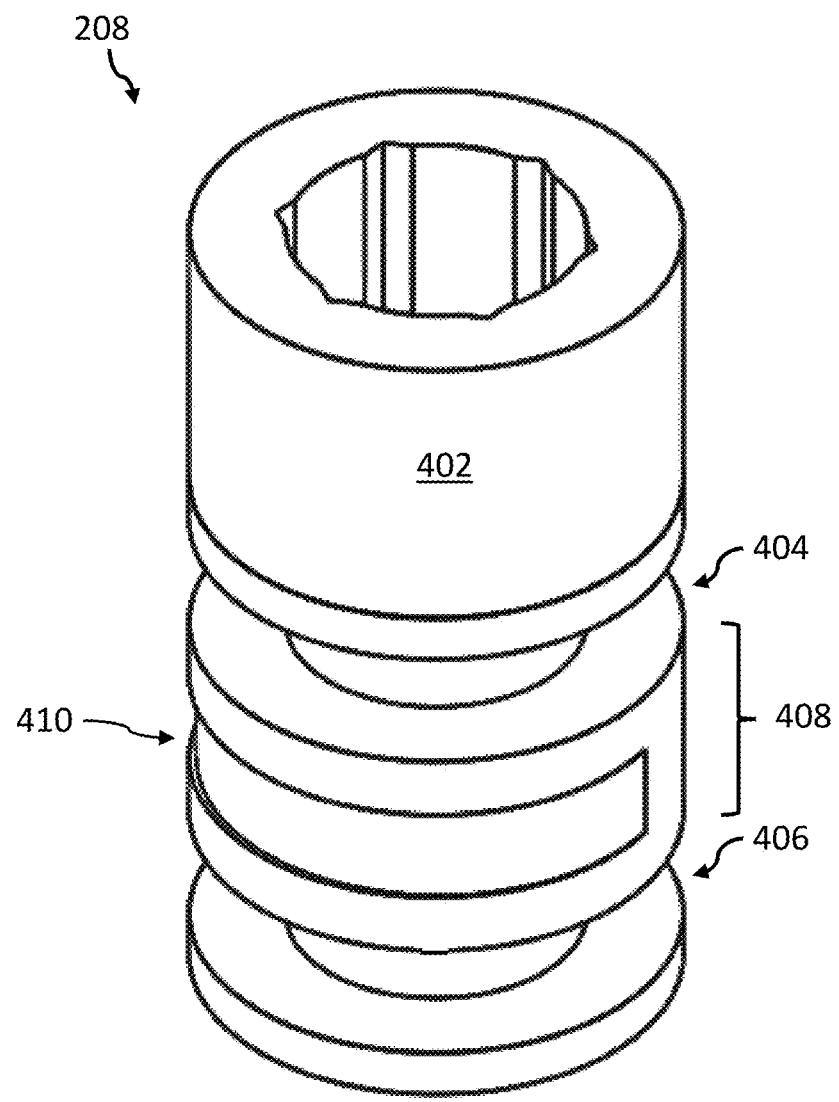
FIG. 5A is a close-up perspective view of the spool of FIGS. 4A and 4B, in accordance with the present systems, devices, and methods.

FIG. 5A is a close-up perspective view of spool 208 of FIGS. 4A and 4B, in accordance with the present systems, devices, and methods. Spool 208 includes cylindrical assembly 402 having eccentric channel 410 in landing 408, and two concentric grooves 404 and 406. As described above with reference to FIG. 4A, concentric grooves 404 and 406 can each provide a respective space for an O-ring or other suitable gasket or seal (not shown in FIG. 5A). In some implementations, each of concentric grooves 404 and 406 includes a respective O-ring, and landing 408 is sandwiched between the two O-rings.

Also, as described above with reference to FIG. 4A, eccentric channel 410 can, in operation, allow hydraulic fluid to flow between ports of a hydraulic valve, e.g., hydraulic valve 102 of FIG. 1.

Figure 5B:
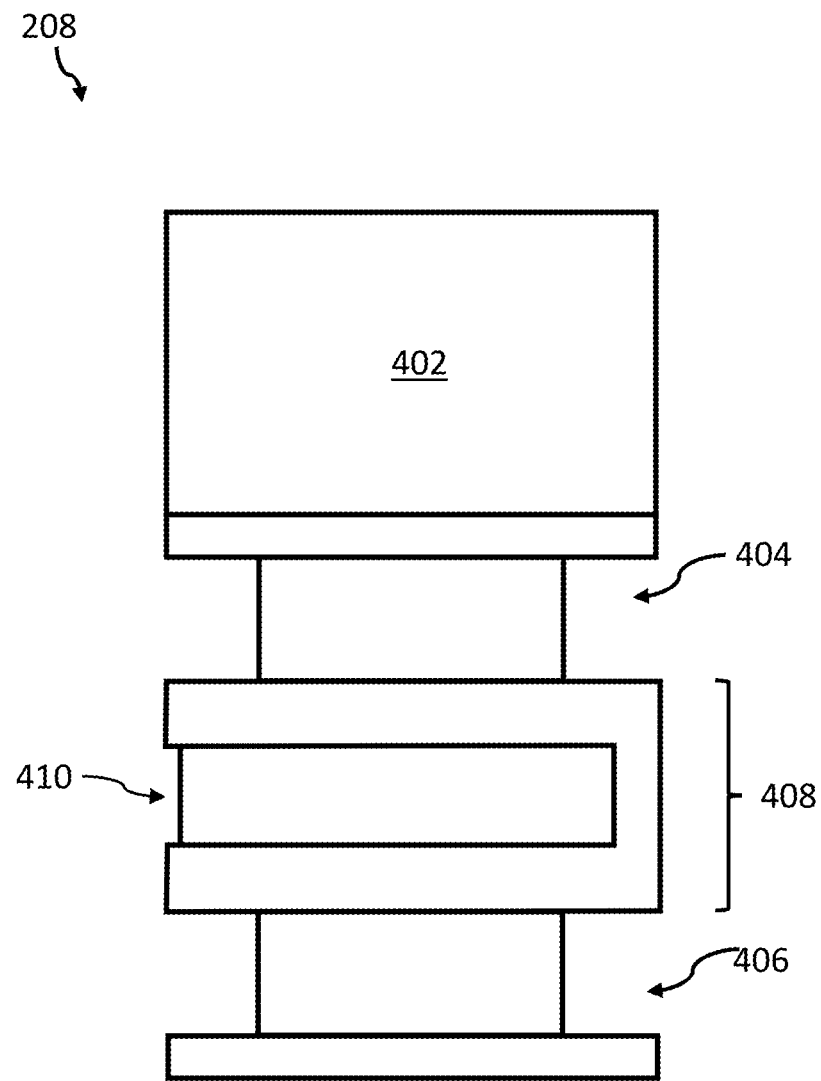
FIG. 5B is a front view of the spool of FIG. 5A, in accordance with the present systems, devices, and methods.

FIG. 5B is a front view of spool 208 of FIG. 5A, in accordance with the present systems, devices, and methods.

In some implementations, spool 208 includes, or is manufactured from, brass. In some implementations, valve body 104 includes, or is manufactured from, aluminum.

Figure 6A:
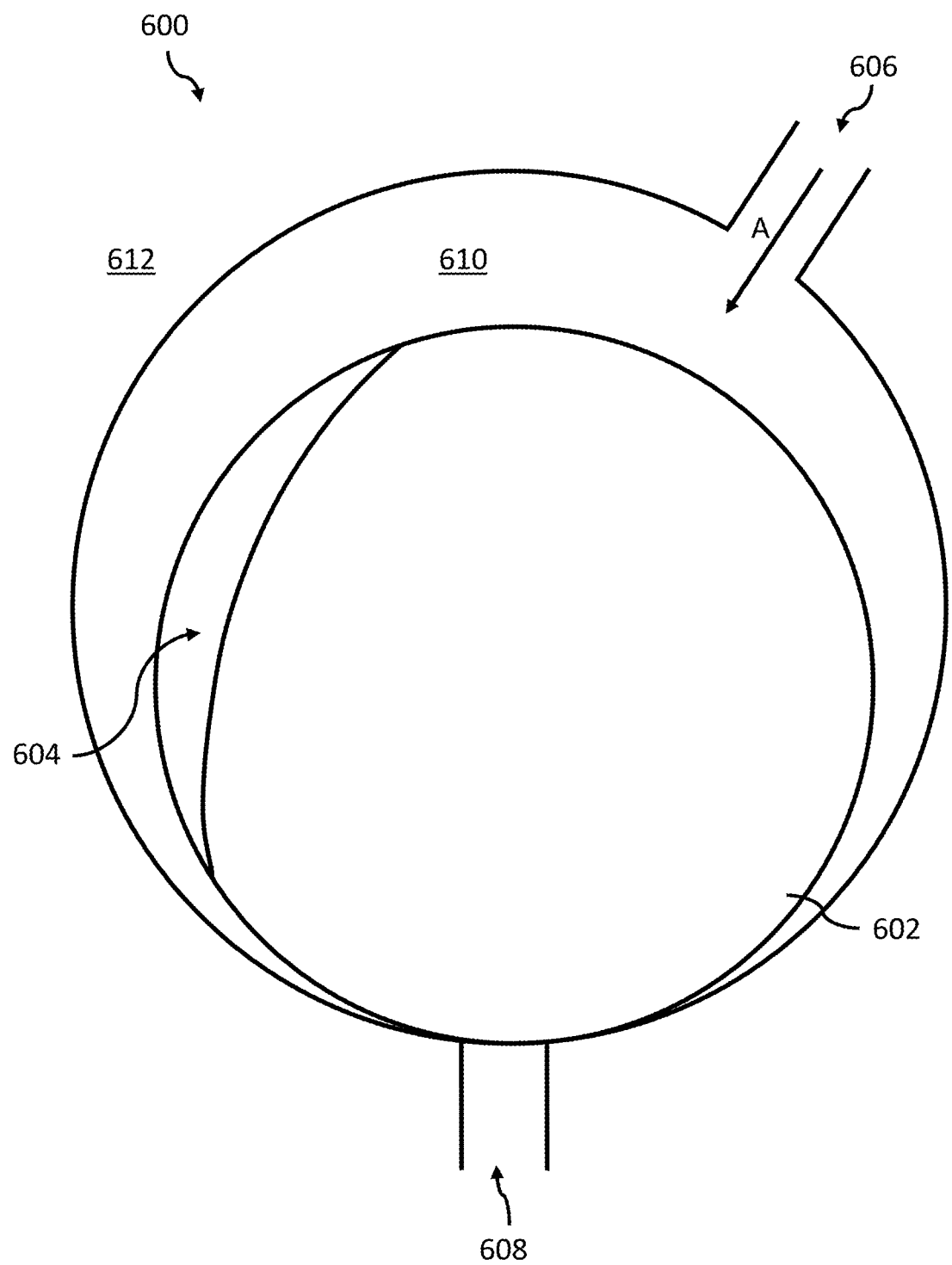
FIGS. 6A and 6B are schematic cross-sectional views of the hydraulic valve of FIG. 1, in accordance with the present systems, devices, and methods.
Figure 6B:
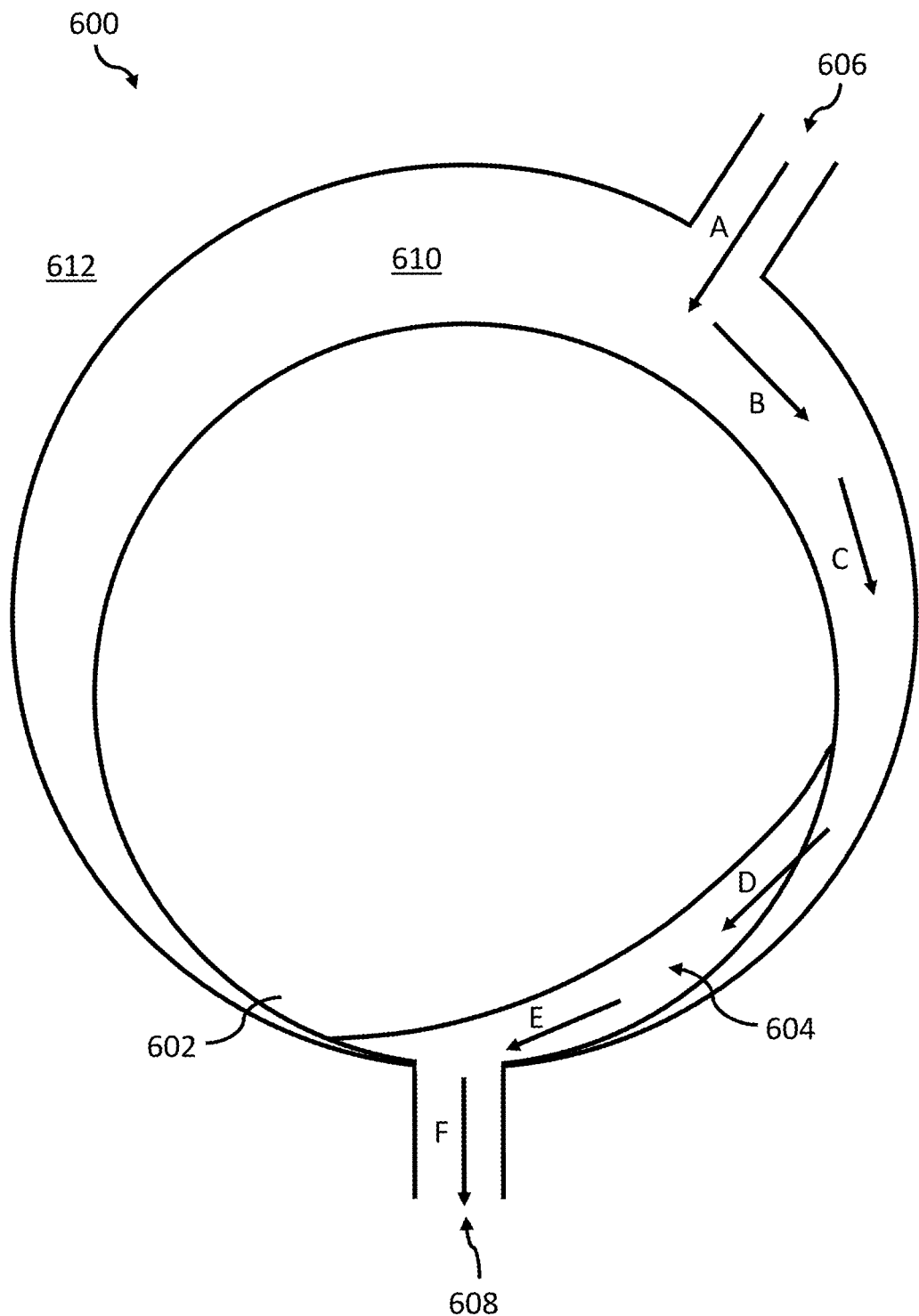

FIGS. 6A and 6B are schematic cross-sectional views of hydraulic valve 102 of FIG. 1, in accordance with the present systems, devices, and methods. FIGS. 6A and 6B illustrate operation of hydraulic valve 102.

FIG. 6A shows a first configuration of hydraulic valve 600 (e.g., hydraulic valve 102 of FIG. 1) in which a spool 602 is rotated to position an eccentric channel 604 so as to prevent a flow of hydraulic fluid from a port 606 to a port 608. Spool 602 is housed in a chamber 610 in a valve body 612 of hydraulic valve 600. In FIG. 6A, hydraulic valve 600 is closed. As indicated by arrow A, port 606 is an inlet. Hydraulic fluid entering hydraulic valve 600 at port 606 is prevented from leaving hydraulic valve 600 at port 608 by spool 602.

Fluid pressure can push spool 602 towards a low pressure port (e.g., port 608) causing the low pressure port to self-seal.

FIG. 6B shows a second configuration of hydraulic valve 600 in which spool 602 is rotated to position eccentric channel 604 so as to allow a flow of hydraulic fluid from port 606 to port 608. Rotating spool 602 can expose port 608 and hydraulic fluid can flow from port 606 (inlet) to port 608 (outlet). In FIG. 6B, hydraulic valve 600 is open. As indicated by arrows A and F, port 606 is an inlet and port 608 is an outlet. Hydraulic entering hydraulic valve 600 at port 606 is routed around the spool via eccentric channel 604 to outlet 608 (as indicated by arrows B, C, D, and E).

In fluid dynamics, an increase in a speed of a fluid can occur simultaneously with a decrease in static pressure or a decrease in the fluid's potential energy. Hence, a lower pressure region can exist where the fluid is in motion causing a minor shift in a net force vector. In the present technology, dynamic forces can be at least partially balanced by a cylindrical portion of the spool where there is no eccentric channel. For at least this reason, if the spool wears over time, the function of the valve, and the leak rate of the valve, show little or no change.

Figure 7:
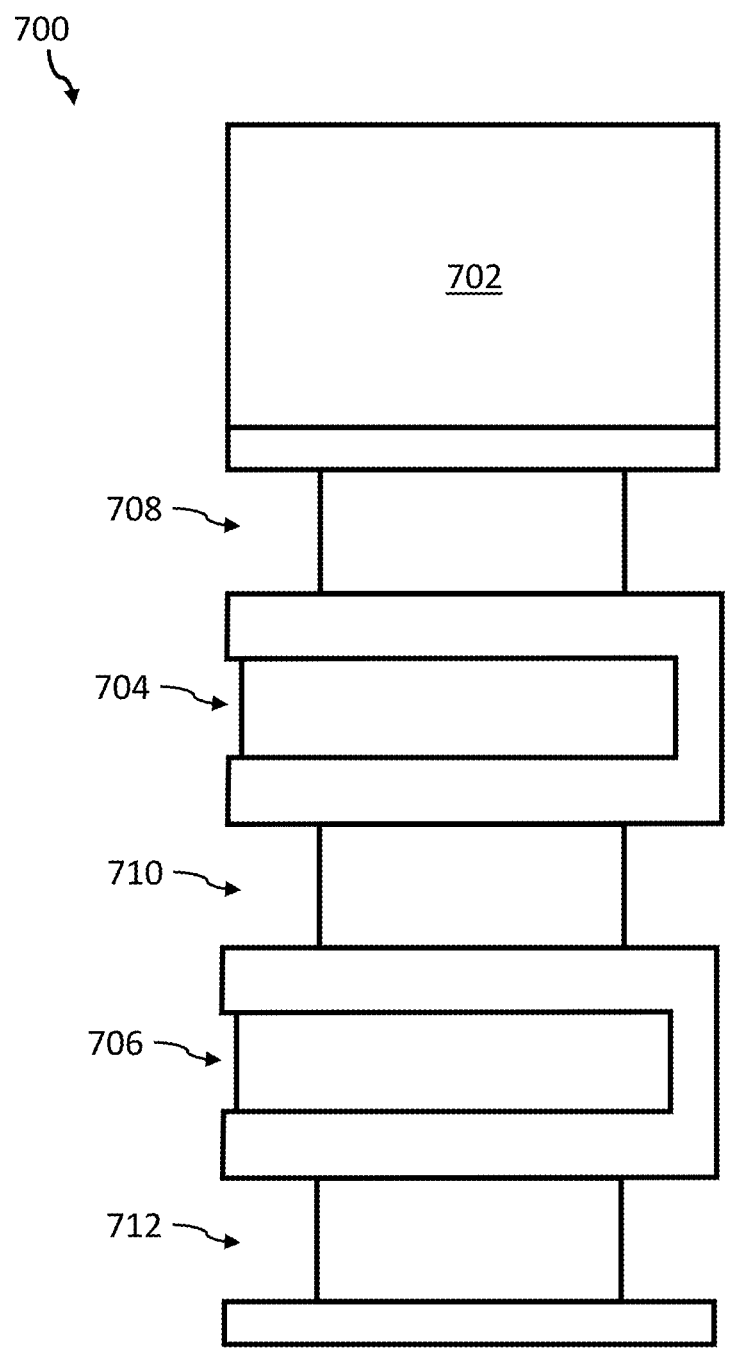
FIG. 7 is a front view of an example implementation of a spool having multiple eccentric channels, in accordance with the present systems, devices, and methods.

FIG. 7 is a front view of an example implementation of a spool 700 having multiple eccentric channels, in accordance with the present systems, devices, and methods. Spool 700 includes a cylindrical assembly 702 having two eccentric channels 704 and 706, and three concentric grooves 708, 710, and 712.

Concentric grooves 708, 710, and 712 can each provide a respective space for an O-ring or other suitable gasket or seal (not shown in FIG. 7).

In operation, eccentric channels 704 and 706 can allow hydraulic fluid to flow between ports of a hydraulic valve, e.g., hydraulic valve 102 of FIG. 1.

Figure 8:
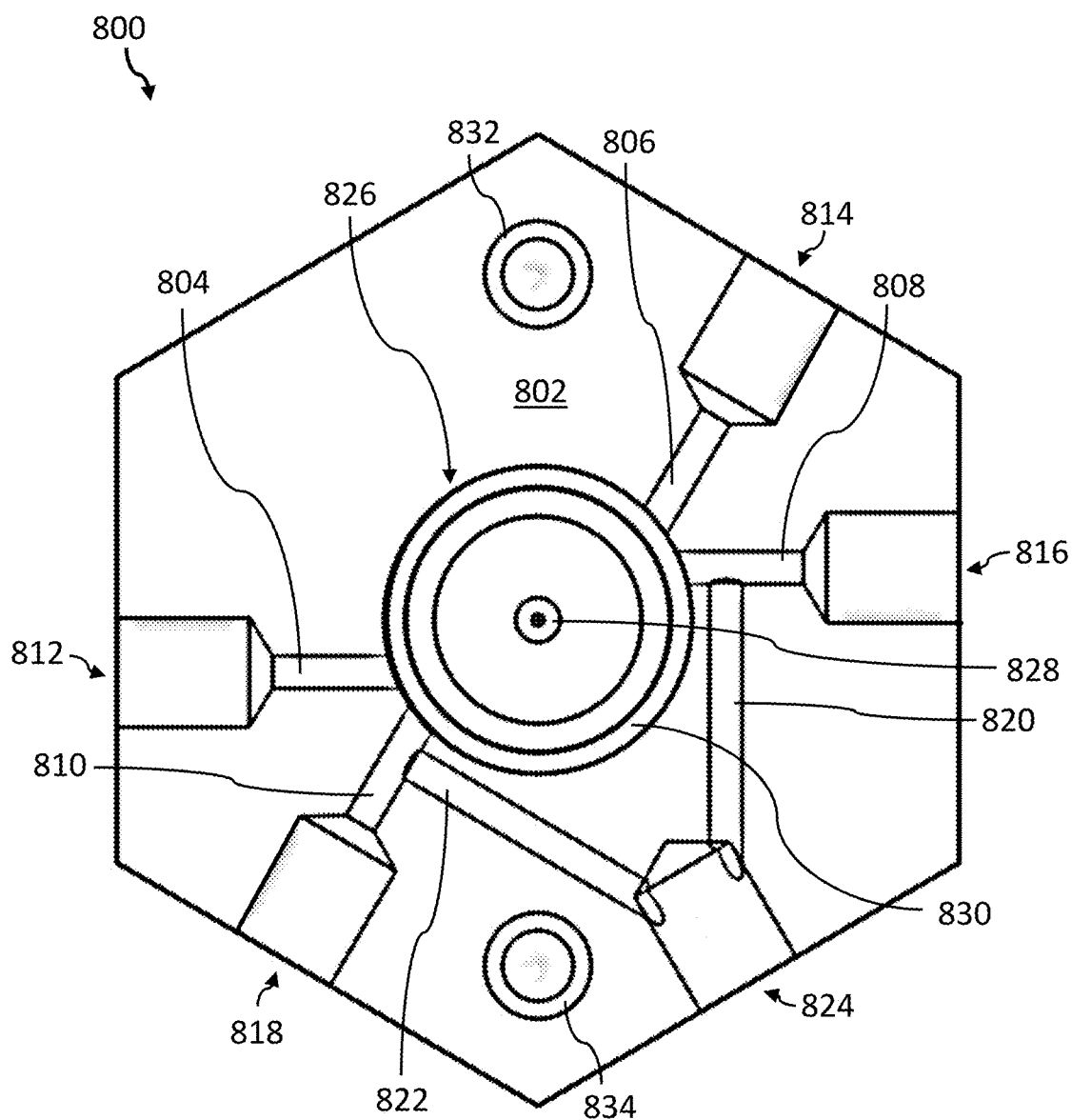
FIG. 8 is a cross-sectional plan view of an example implementation of a hydraulic valve, in accordance with the present systems, devices, and methods.

FIG. 8 is a cross-sectional plan view of an example implementation of a hydraulic valve 800, in accordance with the present systems, devices, and methods. Hydraulic valve 800 is an example of a hydraulic valve for a hydraulic assembly having five ports, typically including at least two inlets and two outlets.

Hydraulic valve 800 includes a valve body 802. Valve body 802 includes four through holes 804, 806, 808 and 810, each through hole hydraulically communicatively coupleable to ports 812, 814, 816, and 818, respectively. Valve body 802 also includes through holes 820 and 822, which are hydraulically communicatively coupleable to a port 824.

Hydraulic valve 800 includes a cylindrical chamber 826. In some implementations, chamber 826 is centrally located in hydraulic valve 800. Hydraulic valve 800 includes a motor shaft 828 and a spool 830. At least a portion of each of motor shaft 828 and spool 830 is positioned to lie along, or at least close to, a longitudinal axis of chamber 826.

Hydraulic valve 800 also includes through holes 832 and 834 for screws used to mount hydraulic valve, for example to a motor.

Figure 9:
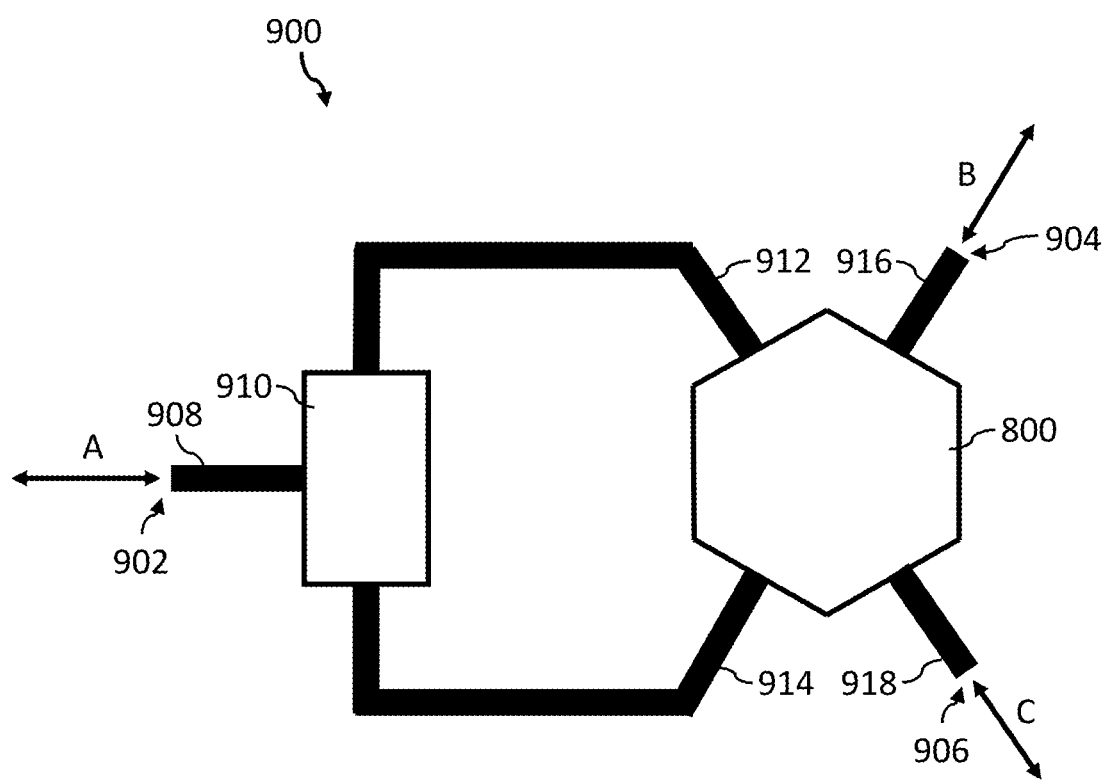
FIG. 9 is a schematic diagram of a hydraulic circuit that includes the hydraulic valve of FIG. 8, in accordance with the present systems, devices, and methods.

FIG. 9 is a schematic diagram of a hydraulic circuit 900 that includes hydraulic valve 800 of FIG. 8, in accordance with the present systems, devices, and methods. Hydraulic circuit 900 includes ports 902, 904, and 906 through which a hydraulic fluid may flow in and/or out of hydraulic circuit 900 as indicated by arrows A, B, and C, respectively.

In some implementations, a hydraulic hose 908 hydraulically couples port 902 to an actuator (not shown in FIG. 9).

In some implementations, the actuator is an actuation piston. Hydraulic circuit 900 includes a splitter 910 operable to direct a flow of hydraulic fluid via hydraulic hoses 912 and 914 to hydraulic valve 800, and vice versa. Splitter 910 is a T-intersection where hydraulic hoses 908, 912, and 914 meet.

In some implementations, port 904 is an inlet and hydraulic fluid can flow into hydraulic circuit 900 at port 904. In some implementations, a hydraulic hose 916 hydraulically couples port 904 of hydraulic valve 800 to an accumulator (not shown in FIG. 9).

In some implementations, port 906 is an outlet and hydraulic fluid can flow out of hydraulic circuit 900 at port 906. In some implementations a hydraulic hose 918 hydraulically couples port 906 of hydraulic valve 908 to a reservoir for a hydraulic pump (the reservoir and the hydraulic pump not shown in FIG. 9).

In some implementations, during operation, hydraulic valve 800 can control a pressure to an actuation piston by allowing hydraulic fluid to flow from the accumulator via port 904 and hydraulic hoses 916, 914, and 908, while simultaneously preventing an exhaust flow from the actuator to the reservoir via port 906 and hydraulic hoses 908, 912, and 918. In this mode of operation, hydraulic fluid flows through hydraulic valve 800 and out of hydraulic circuit 900 to the actuation piston via splitter 910 and hydraulic hose 908.

Similarly, hydraulic valve 800 can control an exhaust from the actuation piston by allowing hydraulic fluid to flow to the reservoir via port 906 and hydraulic hoses 908, 912, and 918, while simultaneously preventing a pressure flow from the accumulator via port 904 and hydraulic hoses 916, 914, and 908. In this mode of operation, hydraulic fluid flows into hydraulic circuit 900 from the actuation piston via hydraulic hose 908 and splitter 910, and through hydraulic valve 800 to the reservoir.

In the illustrated example implementations of FIGS. 8 and 9, hydraulic valve 800 of hydraulic circuit 900 includes two channels per valve to control pressure and exhaust of pistons. In other implementations, hydraulic valves include a single channel per valve. In other implementations, hydraulic valves include more than two channels per valve.

Figure 10:
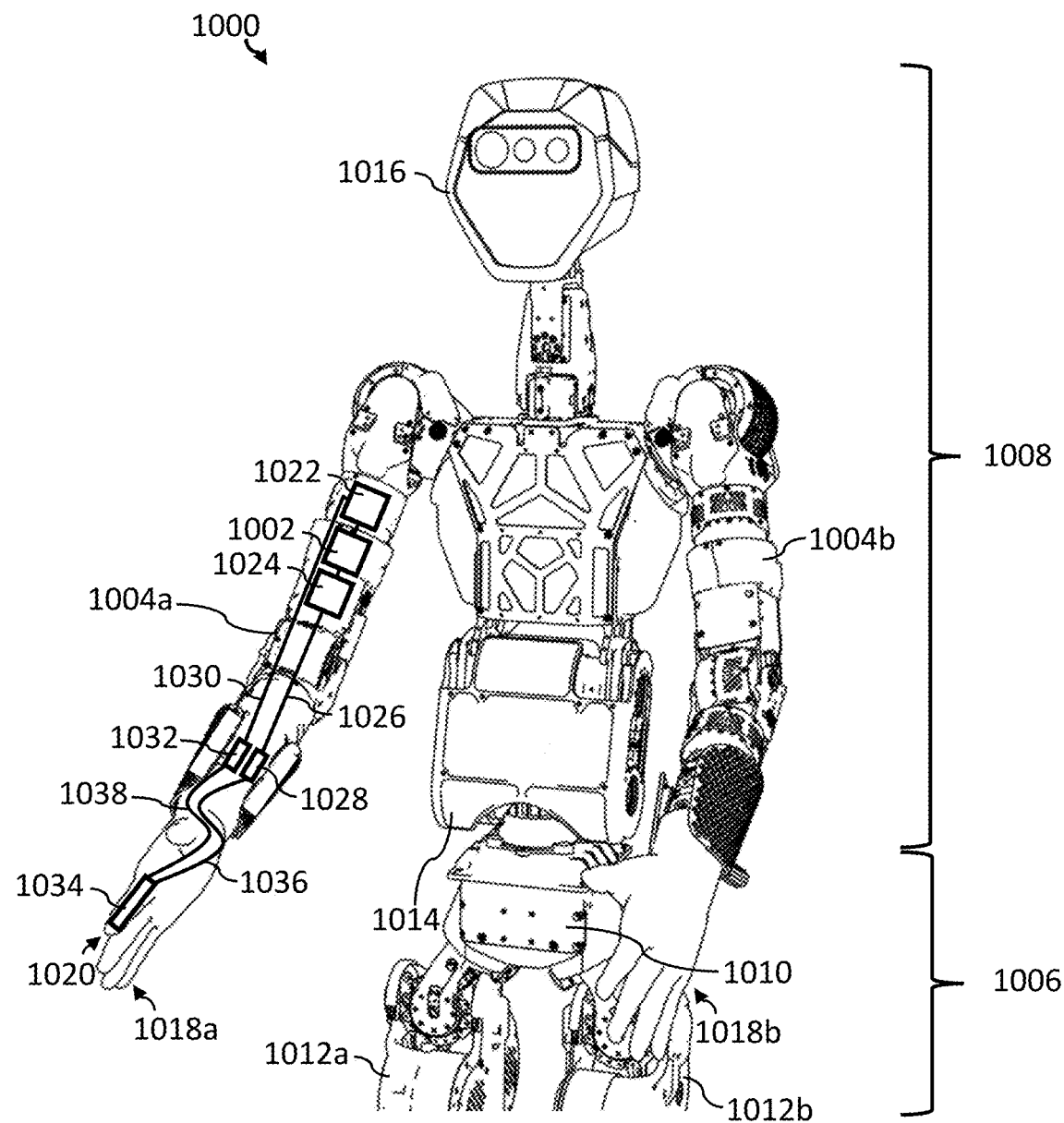
FIG. 10 is a schematic drawing of an example implementation of a hydraulically-powered robot with a hydraulic valve integrated with an arm of the robot, in accordance with the present systems, devices, and methods.

FIG. 10 is a schematic drawing of an example implementation of a hydraulically-powered robot 1000 with a hydraulic pump 1002 integrated with an arm 1004a of robot 1000, in accordance with the present systems, devices, and methods. Hoses are also referred to in the present application as hydraulic hoses.

Robot 1000 comprises a base 1006 and a humanoid upper body 1008. Base 1006 comprises a pelvic region 1010 and two legs 1012a and 1012b (collectively referred to as legs 1012). Only the upper portion of legs 1012 is shown in FIG. 10. In other example implementations, base 1006 may comprise a stand and (optionally) one or more wheels.

Upper body 1008 comprises a torso 1014, a head 1016, right-side arm 1004a and a left-side arm 1004b (collectively referred to as arms 1004), and a right hand 1018a and a left hand 1018b (collectively referred to as hands 1018). Arms 1004 of robot 1000 are also referred to in the present application as robotic arms. Arms 1004 of robot 1000 are humanoid arms. In other implementations, arms 1004 have a form factor that is different from a form factor of a humanoid arm.

Hands 1018 are also referred to in the present application as end effectors. In other implementations, hands 1018 have a form factor that is different from a form factor of a humanoid hand. Each of hands 1018 comprises one or more digits, for example, digit 1020 of hand 1018a. Digits may include fingers, thumbs, or similar structures of the hand or end effector.

In some implementations, base 1004 and/or torso 1014 of upper body 1008 house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of robot 1000 comprises a hydraulic pump 1002, a reservoir 1022, and an accumulator 1024, housed in arm 1004a. Hose 1026 provides a hydraulic coupling between accumulator 1024 and a pressure valve 1028 of the hydraulic control system. Hose 1030 provides a hydraulic coupling between an exhaust valve 1032 of the hydraulic control system and reservoir 1022.

Pressure valve 1028 is hydraulically coupled to an actuation piston 1034 by a hose 1036. Actuation piston 1034 is hydraulically coupled to exhaust valve 1032 by a hose 1038. Hoses 1026 and 1036, and pressure valve 1028, provide a forward path to actuation piston 1034. Hoses 1030 and 1038, and exhaust valve 1032 provide a return path to actuation piston 1034. Pressure valve 1028 and exhaust valve 1032 can control actuation piston 1034, and can cause actuation piston 1034 to move, which can cause a corresponding motion of at least a portion of hand 1018a, for example, digit 1020.

In some implementations, pressure valve 1028 and exhaust valve 1032 are electrohydraulic servo valves controlled by a controller (not shown in FIG. 10). The electrohydraulic servo valves are also referred to in the present application as servo valves and servo-controlled valves. The controller may be implemented by any suitable combination of hardware, software, and/or firmware. The controller may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 1000, for example, in hand 1018a. When the drive piston is driven by the motor, the actuation piston can be forced to move, which can cause a corresponding motion of at least a portion of robot 1000.

In some implementations, the hydraulic fluid in the hydraulic hoses of FIG. 10 (including hoses 1026, 1030, 1036, and 1038) is an oil, for example, peanut oil or mineral oil.

Each of hands 1018 may have more than one degree of freedom (DOF). In some implementations, each hand has up to eighteen (18) DOFs. Each DOF can be driven by a respective actuation piston (for example, actuation piston 1034). For clarity of illustration, only one actuation piston is shown in FIG. 10. Each actuation piston may be located in hands 1018.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 1018 to control eighteen (18) DOFs of each hand. In some implementations, at least some of the hoses shown in FIG. 10 (e.g., hoses 1026, 1030, 6310, and 1038) belong to a bundle of hoses that can accommodate twenty (20) one-eighth inch (⅛ in.) hoses.

In some implementations, a robot with an integrated hydraulic system, such as robot 1000 of FIG. 10, may employ any or all of the teachings of U.S. Provisional Patent Application Ser. No. 63/191,732, filed May 21, 2021 and entitled "Systems, Devices, and Methods for A Hydraulic Robot Arm", which is incorporated herein by reference in its entirety.

Though the example implementation of FIG. 10 of a hydraulically-powered robot with only a single hydraulic system, a person of skill in the art will appreciate that a hydraulically-powered robot may include multiple hydraulic systems. In some implementations, at least some of the multiple hydraulic systems are hydraulically-isolated from one another. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot (especially internally, as in robot 1000). A hydraulic system dedicated to a single component or device, or dedicated to a subset of the multiple components or devices, may be more localized, and more readily adapted to fit within a desired form factor.

Hydraulic assembly 100 of FIG. 1 can be used in the hydraulic control system of robot 1000 to control a flow of hydraulic fluid in the hydraulic control system. Hydraulic valve 102 of FIG. 1 can be used, for example, in pressure valve 1028 and/or exhaust valve 1032.

In some implementations, pressure valve 1028 and exhaust valve 103 can be replaced by a single hydraulic valve having two channels (e.g., hydraulic valve 800 of FIGS. 8 and 9). A two-channel hydraulic valve can be used to control pressure and exhaust flows to/from an actuation piston (e.g., as described with reference to FIG. 9).

Hydraulic valve 102 can be more compact than other types of hydraulic valves, and can be beneficially deployed in restricted spaces and/or in situations where there are a large number of hydraulic connections to be made. Hydraulic valve 102 is also more serviceable than other types of hydraulic fitting.

Figure 11:
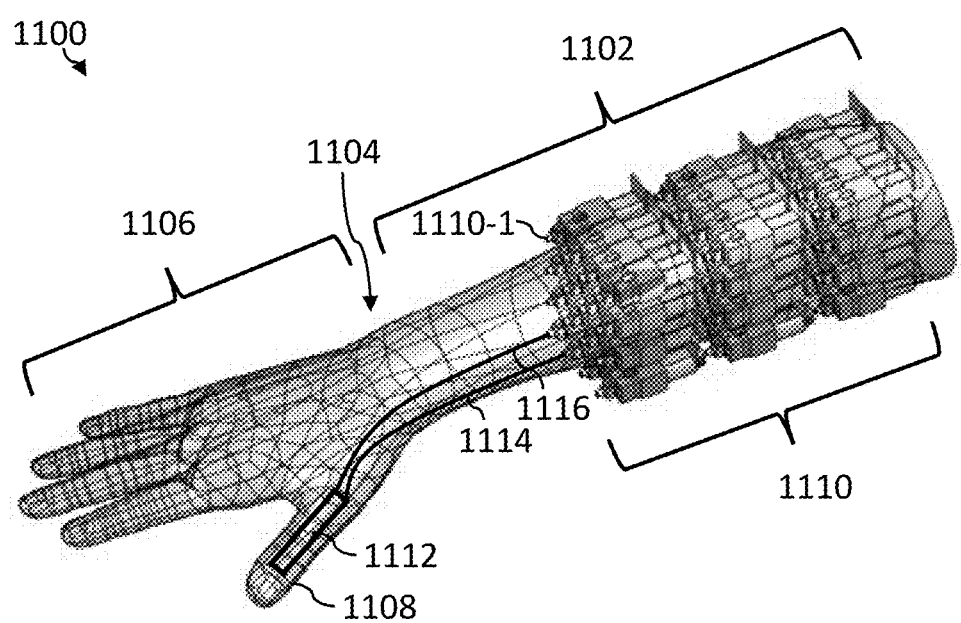
FIG. 11 is a schematic drawing of an example implementation of a portion of a hydraulic system in a forearm, wrist, and hand of a robot (e.g., the robot of FIG. 10), in accordance with the present systems, devices, and methods.

FIG. 11 is a schematic drawing of an example implementation of a portion 1100 of a hydraulic system in a forearm 1102, wrist 1104, and hand 1106 of a robot (e.g., robot 1000 of FIG. 10), in accordance with the present systems, devices, and methods. Hand 1106 includes a digit 1108.

Forearm 1102 includes a set of valves 1110 which is integrated with forearm 1102. Valves 1110 include valve 1110-1. (Only one valve is separately labeled for clarity of illustration.) Valves 1110 may include pressure valves and exhaust valves. Valves 1110 may include electrohydraulic servo valves, and may be operated by a controller (not shown in FIG. 11).

Digit 1108 includes an actuation piston 1112 integrated with digit 1108. Actuation piston 1112 is hydraulically coupled to valves 1110 via a pressure hose 1114 and an exhaust hose 1116.

Pressure hose 1114 and exhaust hose 1116 pass through wrist 1104. Wrist 1104 can be a restricted space (as described above), and, while the diameters of hoses 1114 and 1116 may generally need to be large enough to fulfill the pressure/force requirements of portion 1100 of the hydraulic system, it can be advantageous for a respective diameter of each of hoses 1114 and 1116 to be small enough, and flexible enough, in the region of wrist 1104, to navigate wrist 1104.

Hydraulic valve 102 of FIG. 1 can be used in portion 1100 of the hydraulic control system of FIG. 11 to control a flow of hydraulic fluid in the hydraulic control system. Hydraulic valve 102 may be used, for example, in valves 1110. In some implementations, hydraulic valve 800 of FIG. 8 can be used to control both pressure and exhaust flows to/from an actuation piston (e.g., actuation piston 1112).

As shown in FIG. 11, forearm 1102, wrist 1104, and hand 1106 can be restricted spaces, and there can be a large number of hydraulic connections to be made (e.g., to valves 1110). In one implementation, there are two double-acting DOFs, and consequently twenty (20) hoses running to hand 1106 to control eighteen (18) DOFs of each hand. In some implementations, there are twenty (20) one-eighth inch (⅛ in.) hoses to accommodate in forearm 1102, wrist 1104, and hand 1106.

A person of skill in the art will appreciate that the various implementations of valves and valve systems described herein may, in some applications, be deployed using a fluid other than a hydraulic fluid. For example, in some implementations the various valves and valve systems described herein may use a gas as the fluid, such as in pneumatic applications where the gas may include compressed air and/or compressed inert gas(ses). Thus, unless the specific context requires otherwise, references to valves, valve systems, and fluids throughout this specification and the appended claims should be construed broadly to include, but not be limited to, hydraulics, hydraulic fluids, pneumatics, and other fluid-based applications.

Throughout this specification and the appended claims, the term "actuatable" refers to a system, part, or component that is configured, designed, or otherwise operative to be actuated in use. Hydraulically-actuated components such as those described herein are non-limiting examples of actuatable components.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A valve comprising:
   a valve body;
   a first cylindrical chamber within the valve body;
   a first cylindrical spool within the first cylindrical chamber, the first cylindrical spool rotatable about a longitudinal axis between at least a first position and a second position, the longitudinal axis parallel to a longitudinal axis of the first cylindrical chamber, the first cylindrical spool comprising:
      a first landing having a first thickness parallel to the longitudinal axis of the first cylindrical chamber; and
      a first eccentric channel having a first length that extends around a first portion of an outer circumferential surface of the first landing and a first width less than the first thickness of the first landing;
   a first inlet to the valve;
   a first outlet from the valve, wherein:
      in the first position, the first inlet and the first outlet are fluidly coupled by the first eccentric channel to allow a flow of a fluid circumferentially around the first landing from the first inlet to the first outlet within the valve; and
      in the second position, at least one of the first inlet and the first outlet is obstructed by a second portion of the outer circumferential surface of the first landing to prevent the flow of the fluid from the first inlet to the first outlet within the valve.

2. The valve of claim 1, wherein the first cylindrical spool further comprises a first concentric groove adjacent to the first landing, the first concentric groove housing a first gasket, the first gasket which in operation provides a seal at a first end of the first landing.

3. The valve of claim 2, wherein the first gasket includes, or consists of, a first O-ring.

4. The valve of claim 2, wherein the first cylindrical spool further comprises a second concentric groove adjacent to the first landing, the first landing interposed between the first concentric groove and the second concentric groove, the second concentric groove housing a second gasket, the second gasket which in operation provides a seal at a second end of the first landing.

5. The valve of claim 4, wherein the second gasket includes, or consists of, a second O-ring.

6. The valve of claim 1, wherein the first cylindrical spool is a loose fit within the first cylindrical chamber.

7. The valve of claim 1, wherein the valve body includes, or is manufactured from, aluminum.

8. The valve of claim 1, wherein the first cylindrical spool includes, or is manufactured from, brass.

9. The valve of claim 1, wherein the valve body is a hexagonal prism.

10. The valve of claim 1, wherein at least a portion of the valve body is formed by one of an assembly from multiple elements, a casting, a mold, a 3D-printing, or a machining from a solid cylinder.

11. The valve of claim 1, wherein the valve is a hydraulic valve and the fluid is an oil.

12. The valve of claim 1, wherein each of the inlet and the outlet comprise a respective through hole and a respective fitting, the fitting fluidly coupleable to a hose.

13. The valve of claim 1, the first cylindrical spool also rotatable about the longitudinal axis between at least a third position and a fourth position, the valve further comprising:
   a second landing having a second thickness parallel to the longitudinal axis of the first cylindrical chamber, the second landing separated from the first landing by a first concentric groove, the first concentric groove housing a first gasket, the first gasket which in operation provides a seal between the first landing and the second landing; and
   a second eccentric channel having a second length that extends around a first portion of an outer circumferential surface of the second landing and a second width less than the second thickness of the second landing;
   a second inlet to the valve;
   a second outlet from the valve, wherein:
      in the third position, the second inlet and the second outlet are fluidly coupled by the second eccentric channel to allow a flow of a fluid circumferentially around the second landing from the second inlet to the second outlet within the valve; and
      in the fourth position, at least one of the second inlet and the second outlet is obstructed by a second portion of the outer circumferential surface of the second landing to prevent the flow of the fluid from the second inlet to the second outlet within the valve.

14. The valve of claim 13, the first cylindrical spool further comprising:
   a second concentric groove adjacent to the first landing, the first landing interposed between the first concentric groove and the second concentric groove, the second concentric groove housing a second gasket, the second gasket which in operation provides a seal at an end of the first landing adjacent to the second concentric groove; and
   a third concentric groove adjacent to the second landing, the second landing interposed between the first concentric groove and the third concentric groove, the third concentric groove housing a third gasket, the third gasket which in operation provides a seal at an end of the second landing adjacent to the third concentric groove.

15. The valve of claim 1, further comprising:
   a second cylindrical chamber within the valve body;
   a second cylindrical spool within the second cylindrical chamber, the second cylindrical spool rotatable about a longitudinal axis between at least a third position and a fourth position, the longitudinal axis parallel to a longitudinal axis of the second cylindrical chamber, the second cylindrical spool comprising:
      a second landing having a second thickness parallel to the longitudinal axis of the second cylindrical chamber; and
      a second eccentric channel having a second length that extends around a first portion of an outer circumferential surface of the second landing and a second width less than the second thickness of the second landing;
   a second inlet to the valve;
   a second outlet from the valve, wherein:
      in the third position, the second inlet and the second outlet are fluidly coupled by the second eccentric channel to allow a flow of a fluid circumferentially around the second landing from the second inlet to the second outlet within the valve; and
      in the fourth position, at least one of the second inlet and the second outlet is obstructed by a second portion of the outer circumferential surface of the second landing to prevent the flow of the fluid from the second inlet to the second outlet within the valve.

16. A valve system comprising:
a valve comprising:
- a valve body;
- a first cylindrical chamber within the valve body;
- a first cylindrical spool within the first cylindrical chamber, the first cylindrical spool rotatable about a longitudinal axis between at least a first position and a second position, the longitudinal axis parallel to a longitudinal axis of the first cylindrical chamber, the first cylindrical spool comprising:
  - a first landing having a first thickness parallel to the longitudinal axis of the first cylindrical chamber; and
  - a first eccentric channel having a first length that extends around a first portion of an outer circumferential surface of the first landing and a first width less than the first thickness of the first landing;
- a first inlet to the valve;
- a first outlet from the valve, wherein:
  - in the first position, the first inlet and the first outlet are fluidly coupled by the first eccentric channel to allow a flow of a fluid circumferentially around the first landing from the first inlet to the first outlet within the valve; and
  - in the second position, at least one of the first inlet and the first outlet is obstructed by a second portion of the outer circumferential surface of the first landing to prevent the flow of the fluid from the first inlet to the first outlet within the valve; and
- a motor assembly, the motor assembly operable to rotate the first cylindrical spool within the first cylindrical chamber between at least the first position and the second position.

17. The valve system of claim 16, the motor assembly comprising:
- a motor; and
- a driveshaft, wherein the driveshaft is mechanically coupled to the motor and to the first cylindrical spool.

18. The valve system of claim 16, further comprising:
an accumulator;
a pump;
a reservoir; and
a actuatable component, wherein the valve is operable to control at least one of a pressure or an exhaust of the actuatable component.

19. The valve system of claim 18, wherein the actuatable component is an actuation piston.

20. A robot comprising
a robot body;
a hydraulic control system physically coupled to the robot body;
a hydraulically-actuated component physically coupled to the robot body, the hydraulically-actuated component operable to cause a motion of at least a portion of the robot; and
a hydraulic assembly comprising:
a hydraulic valve, the hydraulic valve comprising:
- a valve body;
- a first cylindrical chamber within the valve body;
- a first cylindrical spool within the first cylindrical chamber, the first cylindrical spool rotatable about a longitudinal axis between at least a first position and a second position, the longitudinal axis parallel to a longitudinal axis of the first cylindrical chamber, the first cylindrical spool comprising:
  - a first landing having a first thickness parallel to the longitudinal axis of the first cylindrical chamber; and
  - a first eccentric channel having a first length that extends around a first portion of an outer circumferential surface of the first landing and a first width less than the first thickness of the first landing;
- a first inlet to the hydraulic valve;
- a first outlet from the hydraulic valve, wherein:
  - in the first position, the first inlet and the first outlet are fluidly coupled by the first eccentric channel to allow a flow of a hydraulic fluid circumferentially around the first landing from the first inlet to the first outlet within the hydraulic valve; and
  - in the second position at least one of the first inlet and the first outlet is obstructed by a second portion of the outer circumferential surface of the first landing to prevent the flow of the hydraulic fluid from the first inlet to the first outlet within the hydraulic valve; and
a motor assembly operable to rotate the first cylindrical spool within the first cylindrical chamber between at least the first position and the second position.

* * * * *